derlt
UNITED STATES PATENT OFFICE.

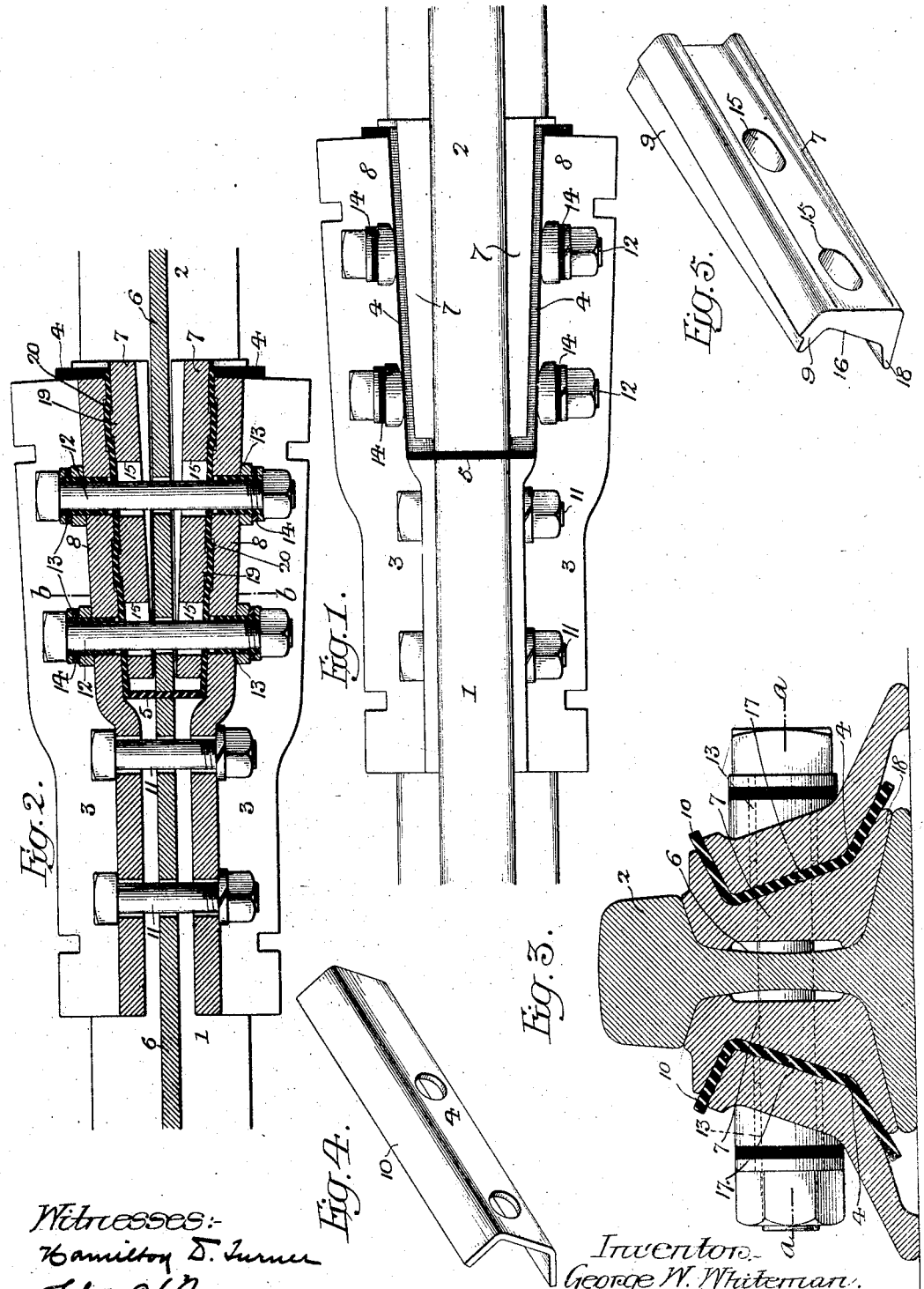

GEORGE W. WHITEMAN, OF PHILADELPHIA, PENNSYLVANIA.

INSULATED RAIL-JOINT.

No. 845,497.　　　Specification of Letters Patent.　　　Patented Feb. 26, 1907.

Application filed April 11, 1906. Serial No. 311,176.

*To all whom it may concern:*

Be it known that I, GEORGE W. WHITEMAN, a citizen of the United States, residing in Philadelphia, Pennsylvania, have invented certain Improvements in Insulated Rail-Joints, of which the following is a specification.

My invention relates to rail-joints, and, while comprising generally improvements in joints having insulating material disposed between the meeting ends of the rails, it consists of certain improvements in the class of structures described and claimed in my application for patent filed September 14, 1905, Serial No. 278,455.

The object of my invention is to simplify the construction of such joints, to provide one in which the wear can be readily taken up, to provide a solid metal support for the receiving end of the rail, and to provide an enlarged bearing-surface for the splice-bars and the wedging members between which the insulating material is held, the surface of the flanged portion of the wedging members exposed to the insulating material being greater than the under surface of the rail-head.

My invention is fully shown in the accompanying drawing, in which—

Figure 1 is a plan view of a rail-joint made in accordance with my invention. Fig. 2 is a sectional plan view of the same, taken on the line *a a*, Fig. 3. Fig. 3 is a cross-sectional view, on an enlarged scale, taken on the line *b b*, Fig. 2, illustrating clearly the character of my present invention. Fig. 4 is a perspective view of one of the insulating-plates, and Fig. 5 is a perspective view of one of the wedging members.

As in the joint forming the subject of my prior application above referred to, the insulation is confined solely to one of the meeting ends of the rails, and in combination with such insulation and the splice-bars, which may be of the ordinary type, bent so as to accommodate the same, I provide wedging members capable of endwise movement for a limited extent to take up any wear that may occur at this point, such members serving also to provide a solid metal support for this rail end and having an upper flanged portion providing a surface exposed to the insulating material overlying the splice-bar that is greater than the under surface of the rail-head.

As in the joint forming the subject of my prior application the meeting end of the rail nearest the point from which the traffic approaches on such line of rails is insulated, which rail I have designated as the "receiving-rail." In ordinary joints this end of the rail is depressed to a greater or less extent every time a train passes over the same, and this depression, especially in the case of insulated joints, causes a great deal of wear, which must be compensated for, and subjects the bolts connecting the splice-bars to a considerable amount of tension and strain. By tightening up the wedge blocks employed in my improved joint I can take up the wear at this point, and by disposing such blocks in engagement with the head and base of the rail I relieve the strain on the bolts connecting this portion of the joint.

In the drawing herewith, 1 and 2 represent the meeting ends of the rails, and 3 the fish-plates or splice-bars, which are of the ordinary standard type, bent at one end to accommodate the insulation. Surrounding the rail end 2 is insulation in the form of longitudinal pieces 4 of hard rubber, parchmentized fiber, or other similar material and a bridge-piece 5 of the same material, disposed directly between the meeting ends of the rails. Interposed between the web 6 of the rail end 2, being in engagement with the head and base of the same, and the insulating-pieces 4 are the wedging members 7, the fish-plates or splice-bars being extended laterally at 8, preferably by bending, to accommodate said insulation and the wedging members. The pieces of insulation are substantially trough-shaped in cross-section, and the splice-bars and wedging members have engaging faces of similar shape, in the present instance the wedging members having flanges 9 at the upper portion for engagement with the flange 10 of the insulating material, the flanges providing a surface exposed to the insulating material greater than the under surface of the rail-head.

The joint is held in place by the usual bolts 11 and 12, the latter passing through the insulated portion and being provided with sleeves 13, of insulating material. Washers 14, of insulating material, are also placed under the usual metal washers adjacent the heads and nuts of the bolts 12.

The wedging members are provided with holes 15, through which the bolts 12 pass, and these holes are elongated, so that said members may be moved endwise when it is desired to take up wear upon this portion of the joint.

The wedging members 7 have an angular outer surface 16, forming substantially a right angle with the under surface of the flange 9, between which and the face 17 of the splice-bars the insulating-pieces 4 are disposed, and this portion of said wedging members terminates in a flange 18. The wedging members are disposed between the head and base of the rail, as clearly shown in Fig. 3, and the portion 8 of the splice-bars overlies the base of the wedging members. By this construction a firm support is afforded at this end of the joint, relieving the tension usually falling upon the bolts. The wedging members have projections 19 and the splice-bars have recesses 20 disposed opposite each other when the joint is assembled, as shown in Fig. 2. These parts coacting displace a portion of the insulating-pieces 4 confined between the same and prevent any creeping of said insulation.

I claim—

1. In an insulated rail-joint, the combination of the meeting ends of the rails, splice-bars connecting said rails, insulating material embracing one of said rail ends and confined by said splice-bars, filler members disposed between said insulating material and the rail, said filler members engaging the underside of the rail-head and having flanges overlying the insulating material, the area of said flanges exposed to said insulating material being of a greater area than the area of the under side of the rail-head, and means engaging said splice-bars for securing the parts in assembled position.

2. In an insulated rail-joint, the combination of the meeting ends of the rails, splice-bars connecting said rails, flanged insulating members disposed adjacent one of said rail ends and confined by said splice-bars, filler members disposed between said insulating members and the rail, said filler members engaging the under side of the rail-head, upper and lower flanges carried by said filler members, the upper flanges overlying the insulating members and having an area exposed to said insulating members greater than the area of the under side of the rail-head, and means engaging said splice-bars for securing the parts in assembled position.

3. In an insulated rail-joint, the combination of the meeting ends of the rails, splice-bars connecting said rails, insulating material embracing one of said rail ends and confined by said splice-bars, adjustable wedging members disposed between said insulating material and the rail, each of said splice-bars having its inner wall adjacent the insulating material disposed at an angle with respect to the vertical with its upper edge substantially at right angles thereto, and said wedging members having a portion of their metal overlying said upper edge and confining therebetween a portion of the insulating material.

4. In an insulated rail-joint, the combination of the meeting ends of the rails, splice-bars connecting said rails, insulating material embracing one of said rail ends and confined by said splice-bars, adjustable wedging members disposed between said insulating material and the rail, each of said splice-bars having their inner wall adjacent the insulating material disposed at an angle with respect to the vertical with its upper edge substantially at right angles thereto, and said wedging members being flanged so as to overlie said upper edge and confine therebetween a portion of the insulating material.

5. In an insulated rail-joint, the combination of the meeting ends of the rails, splice-bars connecting said rails, insulating material embracing one of said rail ends and confined by said splice-bars, wedging members disposed between said insulating material and the rail, said splice-bars being bent to receive said insulating material and the wedging members for holding the same in place, and flanges carried by said wedging members and overlying the insulating material and the splice-bars between which and said wedging members such insulation is disposed.

6. In an insulated rail-joint, the combination of the meeting ends of the rails, splice-bars connecting said rails, insulating material embracing one of said rail ends and confined by said splice-bars, wedging members disposed between said insulating material and the rail, said splice-bars being bent to receive said insulating material and the wedging members for holding the same in place, and flanges carried by the upper side of said wedging members and overlying the insulating material, said flanges having a surface exposed to said insulating material greater than the under surface of the rail-head.

7. In an insulated rail-joint, the combination of the meeting ends of the rails, splice-bars connecting the same, insulating material embracing one of said rail ends, and wedging members disposed between the rail and the insulating material, each of said wedging members having a flange projecting from a point near its upper edge.

8. In an insulated rail-joint, the combination of the rails, splice-bars connecting the same, insulating material disposed adjacent one of said rails, wedging members disposed between said rail and the insulating material, said wedging members engaging the under side of the rail-head and having flanges projecting from the upper edge of the same and overlying said insulating material, the area of said flanges exposed to the insulating material being of a greater area than the area of the under side of the rail-head, and means engaging said splice-bars for securing the parts in assembled position.

9. In an insulated rail-joint, the combination of the meeting ends of the rails, insulating material embracing one of said rail ends, splice-bars for securing the rail ends together and confining the insulating material in place, wedging members disposed between said rail and the insulating material, said splice-bars being of the ordinary type with laterally-deflected portions at adjacent ends to accommodate the insulation and the wedging members, and means engaging said splice-bars for securing the parts in assembled position.

10. In an insulated rail-joint, the combination of the meeting ends of the rails, insulating material embracing one of said rail ends, filling-pieces disposed between said rail end and the insulating material, splice-bars of the ordinary type securing said rail ends together and being bent to accommodate the insulating material and the filling-pieces, said splice-bars being recessed at intervals, and projections carried by the splice-bars opposite the recesses of the splice-bars for displacing a portion of the insulating material to prevent the same creeping.

11. An insulated rail-joint, comprising splice-bars, filler members abutting the rail and in contact with the under side of its head, said members having projections extending therefrom, insulating members interposed between said filler members and the splice-bars, the area of said projections exposed to said insulating members being of a greater area than the area of the under side of the rail-head, and means engaging said splice-bars for securing the parts in assembled position.

12. In an insulated rail-joint, splice-bars secured directly to one rail and having projections deflected therefrom and overlapping the other rail, filler members engaging the under side of the rail-head and the web of the rail, said members having projections extending therefrom, insulating members engaging said filler members and the splice-bars, the area of said projections exposed to said insulating members being of a greater area than the area of the under side of the rail-head, and means engaging said splice-bars for securing the parts in assembled position.

In testimony whereof I have signed my name to this specification in the presence of two subscribing witnesses.

GEORGE W. WHITEMAN.

Witnesses:
MURRAY C. BOYER,
JOS. H. KLEIN.